(No Model.) 2 Sheets—Sheet 1.
S. G. MILLER.
HAY ELEVATING DEVICE.
No. 386,338. Patented July 17, 1888.
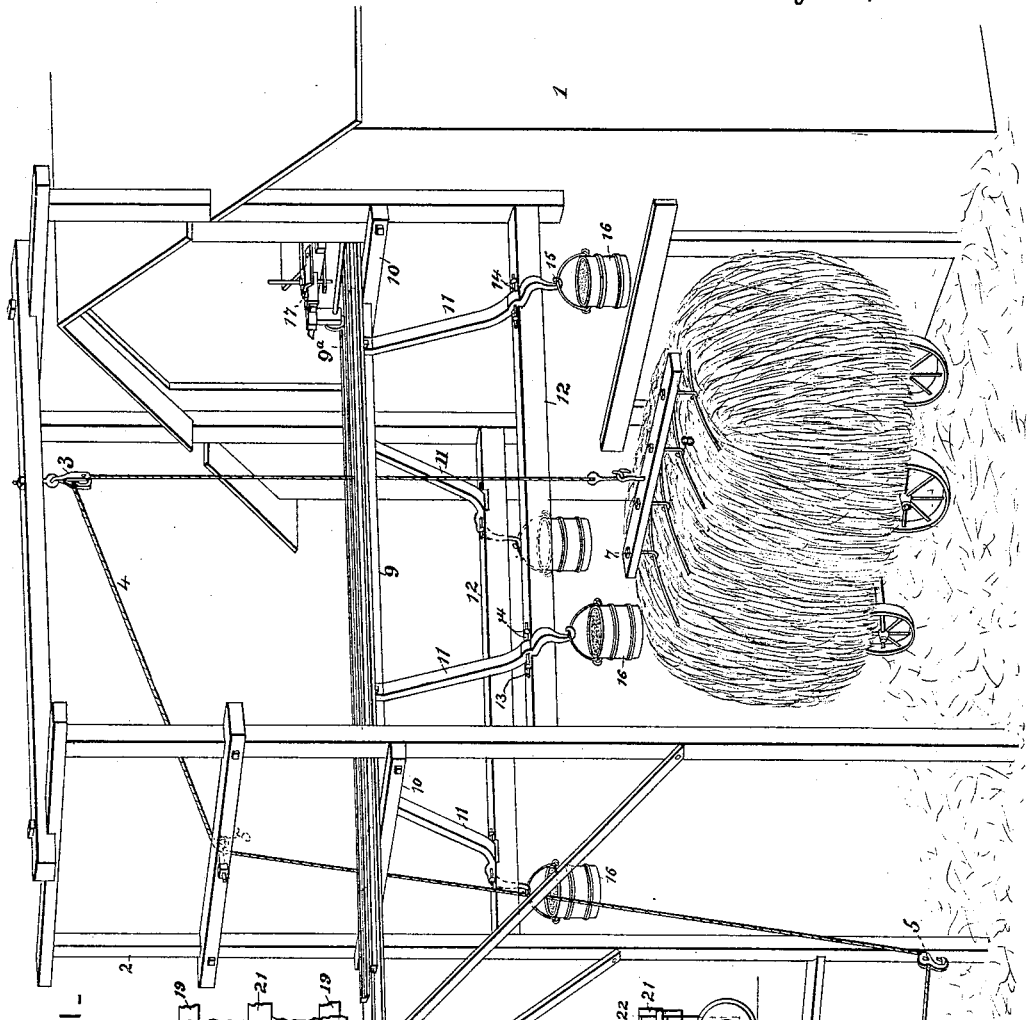
Attest:
Geo. T. Smallwood.
Jas. K. McCathran.
Inventor.
Saml. G. Miller
By Knight Bros
Attys.

(No Model.) 2 Sheets—Sheet 2.

S. G. MILLER.
HAY ELEVATING DEVICE.

No. 386,338. Patented July 17, 1888.

Attest:
Geo. T. Smallwood.
Jas. K. McLathran.

Inventor.
Samuel G. Miller,
By Knight Bros.
Attys.

UNITED STATES PATENT OFFICE.

SAMUEL G. MILLER, OF ATOKA, TENNESSEE.

HAY-ELEVATING DEVICE.

SPECIFICATION forming part of Letters Patent No. 386,338, dated July 17, 1888.

Application filed January 18, 1888. Serial No. 261,115. (No model.)

*To all whom it may concern:*

Be it known that I, SAMUEL G. MILLER, a citizen of the United States, residing at Atoka, in the county of Tipton and State of Tennessee, have invented certain new and useful Improvements in Hay Elevating and Stacking Devices, of which the following is a specification.

My improvements relate to means for elevating from the wagon and conveying to the hay loft or mow a whole load of hay at a single operation, and with as little as possible obstruction of the storing capacity of the loft, if the hay is to be stored in the barn.

To these ends my invention consists in certain details of construction, which I will first fully describe with reference to the accompanying drawings, and then point out in the claims.

Figure 3:
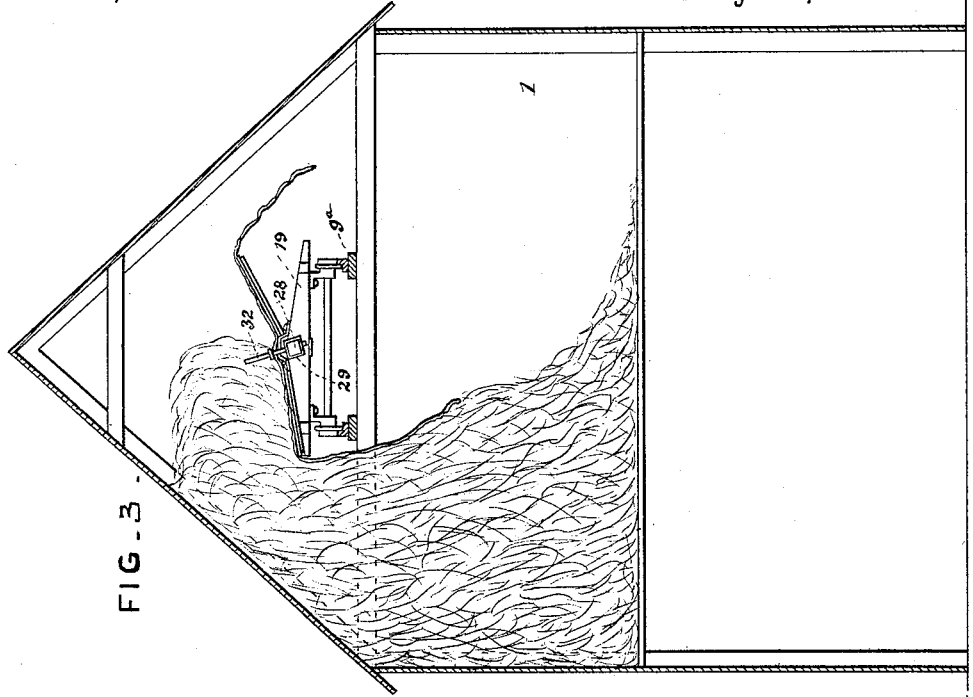
Figure 2:
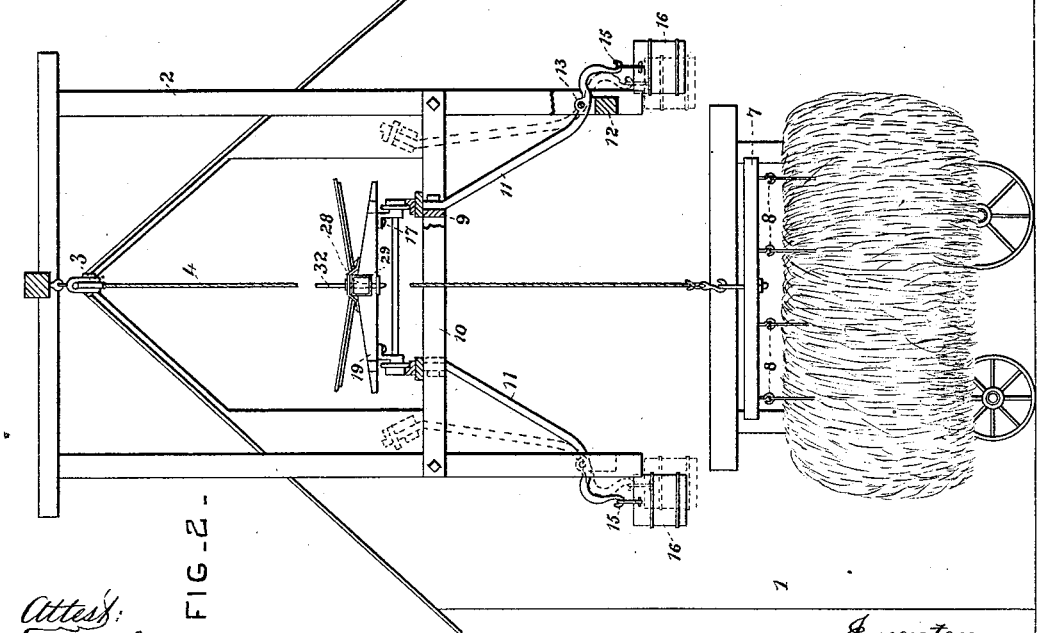

In said drawings, Figure 1 is a perspective view showing the invention in operation for carrying hay to the loft of the barn. Fig. 2 is a vertical sectional view through the track outside of the barn. Fig. 3 is a similar view inside the barn, showing the truck discharging its load. Fig. 4 is a side elevation of my carrier or truck. Fig. 5 is a detail view of a modification of the fastening for retaining the body of the carrier in position. Fig. 6 is a detail view of the front of the truck.

1 may represent a barn, and 2 a frame or derrick outside of the barn, and preferably higher than the latter. On the top beam of the derrick is fixed a block or pulley, 3, over which travels the rope 4, which passes by other blocks or pulleys, 5, to the capstan 6, operated in any usual or suitable manner. From the end of rope 4, which is pendent from block 3, is hung a beam, 7, having a number of hooks, 8. Before loading hay onto the wagon I place in the wagon a system of ropes similar to those described and claimed in my co-pending application No. 248,525, filed September 1, 1887. When the wagon-load having the hay tied according to said application is hauled under the derrick 2, the hooks 8 of beam 7 are slipped under the double portion of the transverse ropes, and, the capstan 6 being turned, the whole load is raised from the wagon. If it be necessary to gain additional power for this purpose, instead of the single block 3 on the derrick, a double block may be used in connection with a single block on the beam 7. It will be readily seen that the power applied to the upper portion of the transverse ropes will lengthen vertically the loops around the hay, compressing the hay laterally, and enabling its removal from the wagon bed and frame with little friction.

On the derrick, and extending for a suitable distance into the barn-loft, is a track, 9 9". The portion 9 outside of the barn, while resting normally on cross-bars 10 on the derrick, is capable of turning on iron arms 11, pivoted near their lower ends to the horizontal beams 12 of derrick 2. In case the lateral contraction of the load of hay caused by the vertical elongation of the loops of the transverse ropes should be insufficient to enable the load to pass easily through the track 9, the latter expands, rising up on the arms 11. Suitable stops, which may be, as shown, simply the uprights of the derrick, prevent the rails of track 9 from quite reaching a position vertically over the pivots of arms 11, so that as soon as the load passes over the track the latter sinks back to place.

The arms 11 may be pivoted to the horizontal beams, as shown, or in any other suitable manner. As shown, the arms are provided with openings for the passage of bolts 13, held in place by means of staples 14. The portions of the arms beyond the pivoted attachments are curved outwardly and downwardly. The extreme ends are formed into hooks 15 for the suspension of weights. These weights may consist of buckets, 16, of sand or gravel; but any other weights may be adopted. The object of suspending weights from these arms is that they prevent too violent dropping back of the track attached to them after the load of hay has passed up.

A truck, 17, is mounted on the track, and may, during the operation of elevating a load of hay, be run back onto the fixed portion 18 of the track projecting beyond the derrick.

The truck consists of a suitable frame, 19, in which is pivoted a central longitudinal beam, 21. One end of the beam is held down by a metallic strap, 22, while the other end is held down by a bracket, 23, perforated at 24, said bracket extending out beyond the front end of the truck. Riveted or bolted on both sides of said beam are upwardly-inclined braces or brackets 25, to which the flooring of the truck-bed may be secured by bolts or rivets. The truck-bed will therefore incline upwardly from the center toward both sides. Below the bracket 23 is a projecting piece or bracket, 26, provided with a perforation, 27. The beam 21 is extended at 28 beyond the frame, and this extension is bound with metal, 29. Both the metal binding and extension are provided with perforations 30 and 31. The perforations in the upper and lower brackets, together with perforation 30 of the beam, receive a rod, 32, which thus locks the truck-bed in position. The perforation 31, which is situated beyond the brackets, is to receive the rod when it is withdrawn from the brackets, so that it may be used as a lever to tilt the truck-bed to one side or the other. When the movable portion of the track falls back to position after the load has passed through, the truck is run thereon under the load, and the latter is lowered onto the truck-bed. When the truck is run into the loft, the truck-bed is tilted and the load of hay, having first been untied, discharged. It will be seen that with this arrangement a very narrow track may, if desired, be employed, encumbering as little as possible the barn-loft.

If desired, the whole of the track and the elevating devices may be placed inside of the barn, if the latter be sufficiently large.

By using a track and truck, as shown, the whole load of hay may be raised at one operation, and it does not take up the amount of room vertically that the ordinary forms of hay-elevators do, for with the latter the hay always hangs down far below the fork, and they are therefore not adapted for use in filling the loft up close to the roof.

A modification of the device for fastening the truck-bed in position is shown in Fig. 5. The extended end of the beam is slotted at 33, in which slot the rod 32ª is pivoted. The lower bracket has formed on its upper side a projection or lug, 34, which is grooved or slotted at 34ª, while the upper bracket is notched at 35. When the truck-bed is to be locked, the rod is placed in a vertical position, the unlocking being accomplished by pulling the upper end of the rod out of the groove and notch into an inclined position.

Having thus described my invention, the following is what I claim as new therein and desire to secure by Letters Patent:

1. In combination with a hay-elevating device, an elevated track having an automatically-movable section, between the rails of which latter the hay-elevating device is situated, whereby the load when elevated is adapted to spread the rails, and a hay-carrier on the track, substantially as described.

2. In combination with a hay-elevating device, an elevated track and a combined automatic and gravitating movable section of such track, and a hay-carrier on the track, substantially as and for the purpose set forth.

3. In combination with a hay-elevating device, an elevated track, the truck on the latter, the frame for supporting the elevator, and a laterally-movable section of track having its rails mounted on upwardly-extending arms pivoted to the frame considerably to one side of the rails, substantially as and for the purpose set forth.

4. In combination with a hay-elevating device, an elevated track, the truck mounted thereon, the frame by which the hay-elevating device is supported, an automatically-movable section of track, arms pivoted to the frame, to which the movable track is secured, and weights at the outer ends of said arms, substantially as and for the purpose set forth.

5. In combination with a hay-elevating device, an elevated track, the truck mounted thereon, the frame for supporting the hay-elevator, a movable section of track, arms secured thereto extending downwardly and outwardly and pivoted to the frame, and hooks at the outer ends of the arms for supporting weights, substantially as and for the purpose set forth.

6. In combination with a hay-elevating device, a truck having a tilting bed with upwardly-inclined sides, a longitudinal beam on which the tilting bed is turned, said beam having bearings in the frame of the truck, a locking-rod, and upper and lower brackets, with which the locking-rod is adapted to engage, whereby the tilting bed is locked in its carrying position, substantially as set forth.

7. In combination with a hay-elevating device, a truck having a tilting bed, a beam extending longitudinally of said tilting bed, said beam being provided with a perforation, an upper and a lower bracket extending out from the frame of the truck and provided with perforations, and a rod received by the perforations in the beam and brackets, whereby the tilting bed is locked, and suitable means for dumping the bed, substantially as set forth.

SAMUEL G. MILLER.

Witnesses:
J. L. ROBINSON,
W. J. RYE.